3,595,617
METHOD OF PREPARING SODIUM HYDRIDE
Jaroslav Vit, Vladimir Prochazka, and Oldrich Strouf, Prague, Czechoslovakia, assignors to Ceskoslovenska Akademie Ved, Prague, Czechoslovakia
No Drawing. Filed Apr. 23, 1968, Ser. No. 723,588
Claims priority, application Czechoslovakia, Apr. 28, 1967, 3,141/67
Int. Cl. C01b 6/04
U.S. Cl. 23—204          3 Claims

ABSTRACT OF THE DISCLOSURE

A method of producing sodium hydride by reacting sodium with hydrogen in the presence of a surface active agent which is an organic compound having 4 to 16 carbon atoms, one of said carbon atoms being a tertiary carbon atom bearing a single hydrogen atom which is activated by an activating group bonded directly to the tertiary carbon atom.

SUMMARY OF THE INVENTION

This invention relates to the preparation of sodium hydride in the form of a fine voluminous powder having a large specific surface, by a reaction which is carried out in the presence of surface active agents.

Sodium hydride is at present an important intermediate product which finds application in many industrial fields, especially in the preparation of complex hydrides, particularly sodium borohydrides or sodium aluminum hydrides, as well as for preparing inorganic or organometallic, hydrogen-containing compounds, which have been difficult to prepare. Sodium hydride may be used, for example, in the preparation of very pure silane, by the thermal decomposition of which, silicium for semiconductors is obtained. Large quantities of sodium hydride are utilized in descaling steel sheets or plates, and in powder metallurgy as a reducing agent. Moreover, it is employed in the organic syntheses of drugs, insecticides and perfumes, as a condensing or alkylating agent.

No practical method of preparing sodium hydride on a large scale has heretofore been known because the direct combination of sodium with hydrogen gas is far more complicated than what would be reasonably expected. Not only are difficulties encountered in substantially completing the conversion of the sodium to sodium hydride, but the major difficulty is producing a fine voluminous powder with a large specific surface. The initial reaction temperature between sodium and hydrogen gas, as found by most investigations, ranges from 200 to 300° C. at elevated pressure. But if the combination is to proceed to completion, it becomes necessary to raise the temperature above 300° C.

The product, however, is only a grayish sand-like mixture containing only from 30 to 40% of sodium hydride, the remainder being metallic sodium. After reaching this state of conversion, the reaction between the metal and hydrogen gas virtually stops because the volume contraction resulting from the hydrogenation causes a dense protective hydride coating to be formed on the surface of the metal particles or drops and on the internal walls of the reactor thus preventing the diffusion of hydrogen gas and the heat transfer. In order to further promote the conversion and thereby enhance the reaction yield, the reaction product which is a hard half-sintered substance, firmly adhering to the walls of the reactor and to the surface of the grinding balls, must be pulverized by grinding. In order to effect a more complete reaction which yields products of a higher purity and of a larger specific surface, several techniques have been proposed.

One method is to hydrogenate the molten metal in a fine dispersion or emulsion of an inert liquid, such as paraffin oil (U.S. Pats. 2,958,012 and 2,898,195), or in a thorough mixture with a finely divided inert solid material, such as sand, iron file dust, soda ash or potash (U.S. Pat. 3,116,112), common salt or sodium hydride itself (U.S. Pat. 2,768,064). In another technique, the reaction between the metal and hydrogen gas is carried out in the presence of catalysts such as alkaline earth metal phenolates (U.S. Pat. 2,392,545), anthracene oil, kerosene, alkali metal salts of fatty acids and hydroaromatic acids (U.S. Pats. 2,372,670 and 2,768,064) or several aromatic and acetylenic hydrocarbons (U.S. Pats. 2,372,671 and 2,504,927).

None of these catalysts, however, enable the preparation of sodium hydride by the technique of a direct combination of the elements. Only the method of hydrogenating a fine dispersion or emulsion of the molten metal in an inert mineral oil, appears to offer any promise of preparing the respective dispersion of sodium hydride.

A complete reaction has been obtained recently by direct combination of the said elements, even without the addition of any inert liquid medium, when the process is carried out in the presence of carbon monoxide, as described in copending application Ser. No. 709,822 filed Mar. 1, 1968 which is assigned to the same assignee as the present application. Despite the advantages of this method, it has a number of drawbacks. While it certainly enables production of sodium hydride in the form of a fine, voluminous powder of a large specific surface, or of a fine dispersion in the reaction medium, carbon monoxide is a very toxic substance. Additionally, it is also very reactive, and enters into the reaction to yield soda and other products, which have obnoxious odors. These by-products of the carbon monoxide conversion contaminate the product and render them unfit in the production of deodorants, perfumes, and flavorings.

It was found that in certain instances it is rather advantageous to incorporate into the mixture, catalysts which are solid at room temperature and atmospheric pressure, and are easily dispersed in the molten sodium; moreover, the catalysts must possess a very active surface, and be free of the deficiency connected with the toxic carbon monoxide. Although the catalysts will remain in the product, their content in the product, however, must be lower than that remaining in the hydride when effective catalytic amounts of carbon monoxide are used. An object of this invention is to provide organic catalysts, which, in contradistinction to the solid organic catalysts used previously, will produce a powdered hydride just as carbon monoxide does. It is another object of the present invention to provide for the direct synthesis of the two elements—sodium and hydrogen— which proceeds at a much higher initial reaction rate, due to the action of the active substances of the present invention. Consequently, industrial production of sodium hydride may thus be carried out in reactors of comparatively small size. Further objects of the present invention will become apparent from the following description.

The present invention is based on the newly established fact that, in the production of sodium hydride by the direct synthesis, as usually carried out at elevated temperatures and pressures and under stirring, optionally in an inert liquid reaction medium, the addition of sodium and hydrogen is substantially improved when further specified agents are incorporated into the mixture in surface active amounts. The agents, that afford sodium hydride by the above reaction in the form of fine voluminous powder with a large specific surface, are compounds, having between 4 and 16 carbon atoms, at least one of said carbon atoms being a tertiary carbon atom bearing a single hydrogen atom which is activated by one of the following groups bonded directly to the tertiary carbon atom:

(I) $ROCH_2$ wherein R is acyl, hydrogen, or sodium;
(II) —COOR' wherein R' is hydrogen, alkyl or sodium;
(III) —COR" wherein R" is hydrogen or alkyl;
(IV) a quinone group, obtainable by rearrangement from an alkylated polyhydric phenol.

The hydrogen atom so activated possesses an acidic nature, and consequently, can be replaced by sodium or some other metal.

The amount of the active surface agent used is of no great importance, and is dependent merely on the nature of the desired product. Amounts smaller than 1% have been found to be sufficiently active, and their use results in a substantial increase of the respective specific surface. It is not desired to use more than 1% of the surface active agent, as calculated on the amount of sodium used, since higher amounts of surface active agent will unnecessarily contaminate the product.

Of the above disclosed compounds, those of the general formula

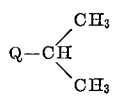

have been found extraordinarily active, in which Q is selected from the group consisting of R—O—$CH_2$—, —COOR' and —COR", wherein R is acyl, hydrogen or sodium, R' is alkyl, hydrogen, or sodium, and R" is hydrogen or alkyl.

From the compounds of the general formula

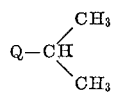

the following are specifically stressed as being active: isobutanol, sodium isobutoxide, isobutyric acid, sodium isobutyrate, isobutyl isobutyrate, and isobutyl formate.

The following compounds from I to III are particularly effective:

Cyclohexanecarboxylic acid, diisopropylacetic acid, diethylacetic acid, ethylpropylacetic acid, 2-ethyl-pentanol-1, 2-cyclohexylpropanol-1, 3-methyl-2-ethylbutanol-1, 2-ethylbutanol-1, cyclohexyl carbonol; sodium salts of these acids and alcohols, their mutual esters, and 3-methylbutanone or pinacone.

Of the compounds obtainable by rearrangement from an alkylated polyhydric phenol (Group IV), the most powerfully active are the dihydric phenol derivatives, wherein at least one carbon atom of the carbon atoms adjacent to the phenolic group is substituted with an alkyl having no hydrogen atom attached to the alpha carbon atom of the said alkyl, specifically the dihydric phenols and sodium phenolates, wherein at least one of the carbon atoms adjacent to the phenolic group is substituted with the tertiary butyl.

The most effective compound of the Group IV, is, according to the present invention, the 3,5-ditertbutylpyrocatechol.

It will be understood, that in addition to the specified compounds intended to be used in the process according to the present invention, industrial products containing these compounds may, of course, be used. These may be for example residues from the methanol synthesis, or fractions of the s.c. oxo-pontol or synthol processes, which are used in the said synthesis.

In contradistinction to carbon monoxide, which is very toxic even in low concentrations, so that safety precautions must be taken to prevent any gas leakage, the above mentioned compounds are safe, and stable at elevated temperatures in the hydrogen atmosphere of the present synthesis.

DETAILED DESCRIPTION

The following examples are given as illustrative only, without limiting the invention to the specific details given therein.

EXAMPLE 1

Into a 2.5 liter rotary pressure vessel, or autoclave, there were introduced a dispersion of 100 g. of sodium in 1 liter of mineral oil, and 1 g. isobutanol. The pressure vessel was closed, flushed with hydrogen and then electrolytically pure hydrogen was introduced to build up a pressure of 150 atm. For a period of 1.5 hours, the reaction mixture was heated to 360° C., and allowed to cool for the next 30 minutes. Unreacted gas was allowed to escape and the pressure vessel was flushed with nitrogen. The pressure vessel was then opened, and the product was poured off through a sieve to retain the steel balls originally in the vessel. The reaction yielded 1 liter of a finely dispersed suspension of sodium hydride in mineral oil, the concentration of which amounted to 11%.

EXAMPLE 2

Into the same pressure vessel as described in Example 1, 100 g. of sodium metal and 1 g. of diethyl acetic acid were charged. The pressure vessel was closed, flushed with hydrogen. Hydrogen of electrolytical grade purity was fed thereinto to build up a pressure of 150 atm. The hydrogenation was carried out at the same reaction conditions as those of Example 1; 98 g. of white voluminous sodium hydride was obtained, which was poured from the autoclave through a sieve to retain the steel balls.

EXAMPLE 3

The hydrogenation of 100 g. of sodium, with the addition of 2 g. isobutyl formate was carried out in the same manner as that of Example 2. 102 g. of white voluminous sodium hydride was obtained.

EXAMPLE 4

The hydrogenation of 100 g. sodium with the addition of 0.5 g. cyclohexane carboxylic acid was carried out in the same manner as described in Example 2; the reaction produced white voluminous sodium hydride in a quantitative yield.

EXAMPLE 5

The hydrogenation of 100 g. sodium with the addition of 0.1 g. sodium diethyl acetate, was carried out in the manner of Example 2, and white voluminous sodium hydride was obtained in a quantitative yield.

EXAMPLE 6

The hydrogenation of 100 g. sodium with the addition of 0.5 g. 2-ethylpentanol-1 was carried out in the same manner as in Example 2; white voluminous sodium hydride was obtained in a quantitative yield.

EXAMPLE 7

The hydrogenation of 100 g. sodium with the addition of 1 g. 2-cyclohexylpropanol-1 was carried out in the same manner as in Example 2; white voluminous sodium hydride was obtained in a quantitative yield.

EXAMPLE 8

The hydrogenation of 100 g. sodium with the addition of 1 g. 3,5-ditert.butyl pyrocatechol was carried out as described in Example 2; white voluminuos sodium hydride was obtained in a quantitative yield.

EXAMPLE 9

The hydrogenation of 100 g. sodium with the addition of 1 g. crude di-tert-butylresorcinol (as obtained according to Gurevio, Chem. Ber. 32, 2425), was carried out in the manner described in Example 2; white voluminous sodium hydride was obtained in a quantitative yield.

EXAMPLE 10

The hydrogenation of 100 g. of sodium with the addition of 1 g. crude di-tert-amylpyrocatechol (as obtained according to Konigs and Mai, Chem. Ber. 25, 2654) was carried out in the manner as in Example 2; white sodium hydride was obtained in a quantitative yield.

In the examples, the sodium hydride obtained had a specific surface between 6000 and 10,000 sq. cm./g., which was established by Blaine's method, modified according to Mazula.

What is claimed is:

1. A process for producing sodium hydride comprising reacting sodium metal and hydrogen at elevated temperature and pressure, while stirring in the absence of an inert medium, in the presence of less than 1%, based on the sodium of a surface active agent consisting essentially of an organic compound having 4 to 16 carbon atoms, one of said carbon atoms being a tertiary carbon atom having a single hydrogen atom, said organic compound having the formula:

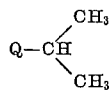

wherein Q is $ROCH_2—$, $R'OOC—$, $R''OC—$; R being hydrogen, acyl or sodium; R' being hydrogen, alkyl or sodium and R'' being hydrogen or alkyl.

2. A process as claimed in claim 1 wherein said surface active agent is at least one compound selected from the group consisting of isobutanol, sodium isobutoxide, isobutyric acid, sodium isobutyrate, isobutyl isobutyrate, and isobutyl formate.

3. A process as claimed in claim 1 wherein said surface active agent is at least one compound selected from the group consisting of cyclohexane carboxylic acid, diethyl acetic acid, sodium salts of these acids, 2-ethylpentanol-1, 2-cyclohexylpropanol-1, and sodium alkoxides of these alcohols.

References Cited

UNITED STATES PATENTS

| | | | |
|---|---|---|---|
| 2,642,344 | 6/1953 | Livingston | 252—309X |
| 2,768,064 | 10/1956 | Baldridge | 23—204 |
| 2,946,662 | 7/1960 | Mosely | 23—204 |
| 3,222,288 | 12/1965 | Hansley et al. | |

FOREIGN PATENTS

| | | | |
|---|---|---|---|
| 1,421,346 | 11/1965 | France | 252—309E |

OSCAR R. VERTIZ, Primary Examiner

G. O. PETERS, Assistant Examiner